Figure 1:
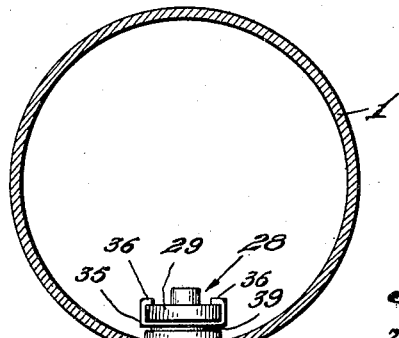

Aug. 23, 1932.  G. A. DE LANGIE  1,873,303

PRESSURE CONTROL MECHANISM

Filed April 28, 1930

Inventor
Godfrey A. DeLangie
By Perley H. Olant
Attorney

Patented Aug. 23, 1932

1,873,303

UNITED STATES PATENT OFFICE

GODFREY A. DE LANGIE, OF NEWPORT, RHODE ISLAND, ASSIGNOR TO EMMA L. DE LANGIE, OF NEWPORT, RHODE ISLAND

PRESSURE CONTROL MECHANISM

Application filed April 28, 1930. Serial No. 447,828.

This invention relates to an improved pressure control mechanism which is particularly adapted for use in controlling the supply of air to automobile inner tubes, although the mechanism is capable of use generally in controlling the application of pressure to various other devices in which pressure control is found desirable.

In the use of pneumatic tires of the balloon type for motor vehicles it has been found desirable to limit the air pressure in the inner tubes within certain definite limits dependent upon the size and character of the tire employed in order to insure the most satisfactory riding qualities and to best maintain and preserve the tire from excessive strain and deterioration. While it has been the practice to employ a tire gauge for limiting the amount of air pressure applied to a pneumatic tire, this always necessitates the removal of the air hose and generally repeated use of the gauge to obtain the desired pressure in the tire, and it frequently happens that excessive pressure is applied through carelessness or neglect to vent the pressure down to the required point after an excessive pressure has been applied to the tire. The present structure is adapted to positively prevent the application of pressure to a tire in excess of that pressure which the tire is designed to receive and which is limited by the particular pressure control plate or movable portion of the pressure control member employed.

One object of the present invention is the provision of an improved means for automatically limiting the pressure applied to an air pressure chamber.

Another object of the invention is the provision of an improved pressure control member and means associated therewith for controlling the movement of a valve in correspondence with the pressure to which the pressure control member is subjected.

A further object of the invention is the provision of an improved pressure control mechanism for pneumatic tires adapted for use in connection with the usual tire valve for preventing the application of pressure to the inner tube in excess of a predetermined amount as determined by a pressure control member which is adapted to actuate an air admission valve for preventing the application of an air pressure to the inner tube in excess of a predetermined pressure.

Another object of the invention is the provision of an improved pressure control member comprising a pressure plate provided with a resilient portion adapted to move into either of two positions in response to changes of pressure.

Other objects and advantages of the invention relate to various improved parts and arrangements of parts for controlling the operation of a valve in accordance with predetermined conditions of pressure as will be more fully set forth in the detailed description to follow:

Referring to the drawing:—

Figure 2:
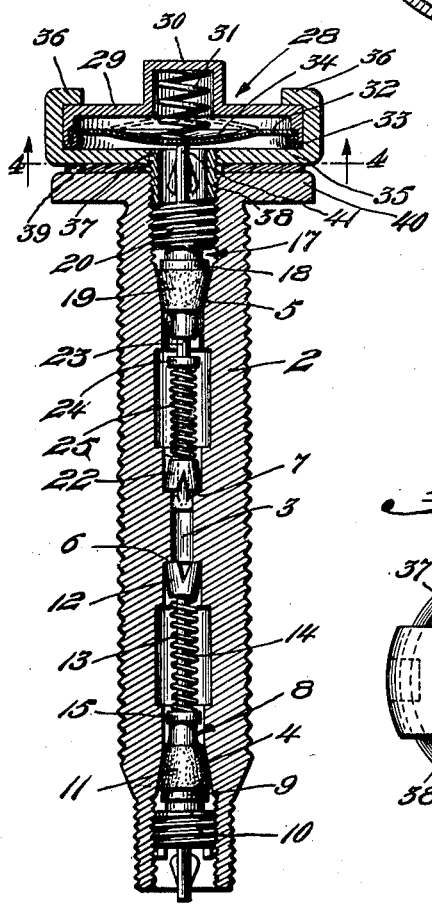
Figure 3:
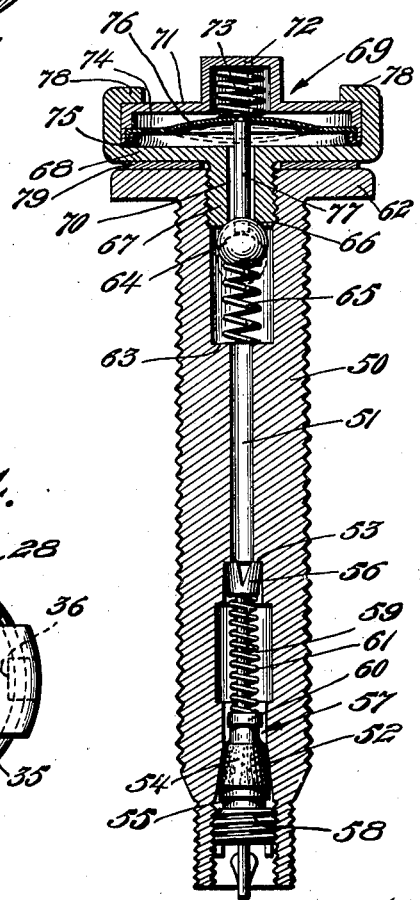
Figure 4:
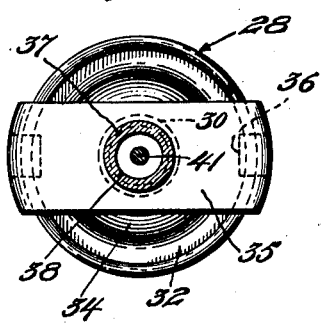

Fig. 1 is a transverse sectional view through a pneumatic tire, of the type employed in connection with motor vehicles, and showing the valve casing and its associated parts in elevation, Fig. 2 is an enlarged longitudinal sectional view through a valve casing and pressure control member, illustrating the position of the valves in the valve casing and their relation to the operating parts of the pressure control member, Fig. 3 is an enlarged longitudinal sectional view of a valve casing, showing a somewhat modified form of pressure control valve and the pressure control member for controlling the operation of the valve, and, Fig. 4 is a top plan view of the pressure control member and holder plates taken along the line 4—4 of Fig. 2.

In the preferred form of the invention as shown in Figs. 1, 2 and 4 of the drawing, 1 designates a pneumatic tire or inner tube of the usual form having a valve casing 2 secured thereto whereby air may be forced into the tire by means of a suitable pump after a manner well-known in the art. The valve casing 2 is provided with a central passage 3 extending therethrough and shaped to provide inclined internal shoulders 4 and 5, and angular shoulders 6 and 7.

A valve structure 8, of a conventional type, is mounted within that end of the valve casing most remote from the inner tube 1, and comprises a sleeve 9, having an exteriorly threaded portion 10 adapted to be threaded within the end of the casing, and a conical portion 11 adapted to engage the inclined shoulder 4 of the casing when the valve structure is in its operative position within the casing. A guide sleeve 12 forming a part of the valve structure 8 is seated against the angular shoulder 6 and held in place thereon by a coiled spring 13 positioned between a valve 15 and the guide sleeve 12. A valve stem 14 is slidably mounted in the sleeves 9 and 12 and carries the valve 15 which is adapted to seat against the inner end of the sleeve 9 when the valve is closed. The coiled spring 13 normally tends to press the valve 15 into engagement with its seat to hold the valve closed, while the application of air pressure from the outer end of the casing opens the valve 15 against the pressure exerted by the spring 13 and the pressure of the air within the inner tube in forcing air into the inner tube.

While the valve casing and valve structure above described are well known in the art, they provide no means for controlling the amount of air pressure which may be applied to an inner tube, and serve only to prevent the leakage of air from the inner tube after the desired air pressure has been applied thereto. In order to control or limit the pressure which may be applied to the inner tube and to avoid the necessity of making frequent use of a tire gauge and the venting of air from the inner tube when it is found that excessive pressure has been applied as well as to insure against errors on the part of the user, a second valve structure 17 is located in that end of the inner tube casing nearest to the inner tube, and the valve structure 17 is oppositely positioned relative to the valve structure 8. The valve structure 17, like the valve structure 8, comprises a sleeve 18 having a conical portion 19 adapted to seat against the inclined shoulder 5 of the valve casing, and an exteriorly threaded portion 20 so formed as to thread within and project materially beyond the inner end of the valve casing for a purpose which will be more fully described hereinafter. The valve structure 17 also comprises a guide sleeve 22 adapted to seat upon the angular shoulder 7 of the casing, and a valve stem 23 movable within the sleeves 18 and 22 and provided with a valve 24 carried thereby which is closed by seating against the end portion of the valve sleeve 18. A coiled spring 25 surrounds the valve stem 23 between the guide sleeve 22 and the valve plate 24 carried by the stem and tends to force the valve 24 against the end portion of the sleeve 18 to close the valve.

The above construction results in the provision of a valve means for preventing the escape of air from an automobile tire or inner tube through the operation of the outwardly acting valve 15 engaging the valve sleeve 8, and the provision of an oppositely positioned valve structure, such as 17, which would normally serve to prevent the forcing of air into the inner tube. However, a pressure control means is provided which is adapted to open the valve 24 when the pressure within the inner tube falls below a predetermined point and thus permit the forcing of air into the inner tube through the valve casing 2, and past the valve 24, until such time as the pressure of air within the inner tube reaches a predetermined amount, when the pressure control mechanism is automatically actuated to cause the valve 24 to close and thus prevent the application of an excessive air pressure to the tire.

The pressure control means, which is designated generally as 28, comprises a cup-shaped member 29, the central portion of the base of which may be depressed as at 30 to serve as a seat for one end of a coiled spring 31. A thin metal plate 32 closes the open end of the cup-shaped member and is secured in place in such a manner as to completely seal the interior of the cup-shaped member in any suitable manner, as by spinning over the rim 33 of the cup-shaped member as indicated in Figs. 2 and 3, by soldering, or in any other suitable or described manner. Whatever means may be employed for forming the union between the rim 33 of the cup-shaped member and the metal plate 32, it is necessary that an air-tight joint be formed so that no air can pass from or to the interior of the cup-shaped member when the parts are in assembled position. The thin metal plate 32 is provided with a central dent or concavo-convex portion 34 which is flexibly distortable, that is, which is capable of assuming automatically either of two positions, as indicated by full and dotted lines in Figs. 2 and 3 dependent upon the variations in pressure upon opposite sides of the thin metal plate. One end of the coiled spring 31 seats against the concavo-convex portion 34 of the metal plate 32 and normally tends to force the dented portion into the position shown in full lines in Fig. 2 of the drawing. The pressure control member 28 is secured in position adjacent to that end of the valve casing nearest to the tire by means of a holding plate 35 having its ends 36 inturned beneath the pressure control member, and provided with a threaded opening 37 located substantially opposite to the dented portion 34 of the metal plate 32 for engaging that portion of the exteriorly threaded end 38 of the valve sleeve 17 which projects beyond the end of the valve casing nearest to the tube. A locking washer 39 is preferably positioned between the head 40 of the valve casing and the holding plate 35 to prevent the holding plate from working loose from the threaded end 38 of the valve sleeve 17. The valve stem 23 has one end 41 which normally projects slightly beyond the exteriorly threaded end 38 of the sleeve 17 in position to be engaged and actuated by the dented portion 34 of the metal plate 32. The valve casing 2 and pressure control member 28 may be secured to the tire 1 by having the valve casing passed through an opening formed in the tire or tube, as shown in Fig. 1 in the drawing, so that the head 40 will seat against the interior surface of the inner tube, and the parts may be firmly secured together by any suitable or desired means, as through one or more lock nuts 45.

In the operation of my improved structure as shown in Figs. 1, 2 and 4 of the drawing, the air pressure upon the interior of the pressure control member 28 may be normal atmospheric pressure, or may be a pressure greater or less than normal atmospheric pressure, dependent upon the construction of the metal plate 32 and the pressure at which it is desired that the valve 24 be actuated for controlling the pressure to be applied to the interior of the inner tube 1. The outer valve structure 8 is of a conventional type and operates in the usual manner to admit air to the inner tube 1 under pressure upon the application of an air pressure hose to that end of the valve casing 2 most remote from the tire.

The inner valve structure 17 includes the valve 24 which is controlled by the position of the concavo-convex portion 34 of the metal plate 32. When the air pressure in the interior of the inner tube 1 is maintained at or approximately at the predetermined point, which has been fixed as that under which the most favorable operating conditions are obtainable, the concavo-convex portion 34 of the plate 32 is forced inwardly by reason of the pressure upon the outer face thereof, which is the pressure obtaining in the interior of the inner tube, being in excess of that obtaining within the interior of the cup-shaped member 29, and the valve 24 is closed by being seated against the end of the sleeve 18 through the action of the coiled spring 25. In this position of the parts no more air can be forced into the interior of the inner tube 1 and, therefore, pressure in excess of that which is adapted to produce the most favorable operating condition cannot be applied to the tire.

When the pressure in the inner tube falls below the point previously determined as best suited for its operation, the air pressure within the cup-shaped member 29 reinforced by the coiled spring 31 moves the dented portion 34 from its abnormal or dotted line position as shown in Fig. 2, to its normal or full line position as shown in that figure, and this movement of the dented portion 34 of the metal plate 32 actuates the valve stem 23 to unseat the valve 24 and move it to its open position as shown in Fig. 2. In this position of the parts air may be forced into the inner tube through the valve casing 2 in the usual manner until the pressure within the inner tube reaches such a point that it forces the concavo-convex portion 34 of the metal plate 32 sharply inwardly into its dotted line position as shown in Fig. 2, and thus permits the valve 24 to close. By this means the application of air pressure to the inner tube is automatically cut off when the pressure in the inner tube reaches a predetermined point regardless of the amount of pressure being delivered by the air pump, and no tire gauge or other means is necessary to determine the pressure in the inner tube. If the air pump is delivering a pressure greater than that required for the inner tube, its only effect will be to build up a high pressure in that portion of the valve casing 2 which serves as a reservoir between the valve structures 8 and 17 and force the valves 15 and 24 more firmly against their seats and thus serve to prevent leakage of air from the inner tube through the valve casing.

In that embodiment of the invention illustrated in Fig. 3 of the drawing, the valve casing 50 is provided with a central passage 51 extending therethrough and formed to provide an inclined shoulder 52 and an angular shoulder 53 for engagement by the conical portion 54 of a valve sleeve member 55 and the guide sleeve member 56 respectively of the valve structure 57. The valve sleeve member 55 has an exteriorly threaded portion 58 adapted to be threaded within the end of the valve casing 50, and a valve stem 59 is slidably mounted in the sleeve members 55 and 56 and carries a valve 60 which is adapted to be seated by being forced into engagement with one end of the sleeve member 55 by means of a coiled spring 61. The construction of that portion of the valve casing farthest removed from the inner tube as well as the above described valve structure is similar in all respects to that shown in Fig. 2 of the drawing.

The valve casing 50 is provided with an enlarged head 62 located at that end of the casing nearest to the inner tube, and that portion of the passage 51 located adjacent to the inner tube is enlarged to provide an annular internal shoulder 63 and furnish space for housing a valve 64 and coil spring 65. The spring 65 has one end seated against the internal shoulder 63 and engages the valve 64 to normally force the same into contact with a seat 66. The enlarged portion of the passage 51 has the wall thereof threaded adjacent to the end of the valve casing for engagement with an externally threaded projection 67 formed integral with a holding plate 68 which supports the pressure control member 69. A central passage 70 is formed in the threaded projection 67 and is located in substantial alignment with the central passage 51 when the parts are in assembled position.

The pressure control member 69 comprises a cup-shaped member 71 provided with a depressed portion 72 adapted to receive and serve as a seat for a coil spring 73, and the open end of the cup-shaped member 71 is adapted to be closed by a thin metal plate 74, the outer edge of which is united with the rim 75 of the cup-shaped member 71 by having the rim spun over the edge of the metal plate or by soldering the parts together or by any other suitable means for uniting the parts so as to provide an airtight connection whereby the interior of the cup-shaped member is hermetically sealed against loss of air. The central portion of the thin metal plate 74 is provided with a dent or concavo-convex portion 76, which is concavo-convex along every line of cross-section.

A pin 77 has one end fixedly secured to the concavo-convex portion 76 of the metal plate and projects into the passage 70 in such a manner as to engage the valve 64 for actuating the valve upon movement of the concavo-convex portion 76 of the metal plate 74. Portions of the ends 78 of the holding plate 68 extend across and are bent over the pressure control member 69 in order to securely retain the same in proper operative position relative to the end of the valve casing 51. A suitable sealing gasket 79 is positioned between the holding plate 68 and the end of the valve casing to prevent air from entering into or escaping from the interior of the valve casing to the interior of the pneumatic tire or inner tube.

In the operation of that form of the invention shown in Fig. 3 of the drawing, the air pressure upon the interior of the pressure control member 69 may be normal atmospheric pressure, or may be a pressure greater or less than normal atmospheric pressure dependent upon the character of the metal plate 74 and the degree of resiliency possessed by the concavo-convex portion 76 thereof as well as the pressure at which it is desired that the valve 64 be actuated for controlling the pressure to be applied to the interior of the tire. The outer valve structure 57 is of a conventional type and operates in the usual manner to admit air to the inner tube under pressure upon the application of an air pressure hose to that end of the valve casing 50 most remote from the inner tube.

In this form of the invention the inner valve structure comprises a ball 64 resiliently held in engagement with a seat 66 by means of a coiled spring 65, the valve being adapted to be moved to its open position by means of the pin 71 secured to the concavo-convex portion 76 of the metal plate 74. In this as in the preceding construction, when sufficient pressure is applied to the inner tube to inflate it to the proper degree that pressure acting upon the outer surface of the thin metal plate 74 forces the concavo-convex portion thereof into the position indicated in the full line in Fig. 3 of the drawing thus permitting the ball 64 to engage its seat 66 and prevent the passage of any further air to the tire. When the pressure within the tire falls below that which the pressure control member is set to maintain, the pressure within the cup-shaped member 71, reinforced by the spring 73, automatically returns the concavo-convex portion 76 of the metal plate 74 to its dotted line position as shown in Fig. 3, thus moving the pin 74 inwardly and unseating the valve 64 so that air pressure may be forced into the inner tube through the passages 51 and 70 until a sufficient amount of air pressure has been applied to the tire so that it will effect a reversal in the position of the concavo-convex member 76 of the metal plate 74 and return the same to its full line position thereby again permitting the valve 64 to close.

It will be seen that in both forms of the invention shown and described the holding plates 35 and 68 are spaced a sufficient distance from the metal plates 32 and 74 to permit the free passage of air from the interior of the valve casing to the interior of the inner tube or vice versa in all positions of the plates 32 and 74. It will be seen upon reference to Fig. 4 of the drawing that the holding plate 35 does not extend entirely across the face of the pressure control member, thereby providing ample space for the free passage of air between the holding members and the flexible plates which close the open ends of the cup-shaped members.

It will be seen that in each of the above constructions air can always be vented from the interior of the pneumatic tire or inner tube regardless of the degree of pressure existing within the inner tube or the pressure obtaining within the valve casing and between the oppositely positioned valves located therein. As illustrative of that statement it will be seen that when pressure is exerted upon the outer end of the valve stem 14 as shown in Fig. 2, the valve 15 may be pressed inwardly from its seat even when high pressure obtains within the interior of the casing 2, and as the valve 15 opens the pressure within the valve casing will immediately fall to normal atmospheric pressure. This will cause the valve 24 to open regardless of the position of the concavo-convex portion 34 of the plate 32, and thus permit the air in the pneumatic tire or inner tube in excess of normal atmospheric pressure to escape in the same manner as in the case of the constructions now in common use. The valves 15 and 24 or 60 and 64 as shown in the illustrated embodiment of the invention open towards each other and inwardly of the passage through the valve casing, or in other words, these valves open in opposite directions relative to the path of travel of the air in its passage into or out of the air pressure chamber, in such a manner that one of the valves when closed serves to prevent the passage of air to the air pressure chamber and the other of said valves when closed serves to prevent the passage of air from the air pressure chamber.

It is to be understood also that the concavo-convex portions of the metal plates 32 and 74 are inherently resilient and tend to return to their normal positions, as indicated in full lines in Fig. 2, when the pressure within the inner tube falls sufficiently low to permit such movement. Moreover, they may be assisted in such return by the coiled springs 31 and 73, the springs being constructed of the necessary stiffness for the purpose. However, the natural tendency of the concavo-convex portions 34 and 76 may suffice to effect this return movement even without the use of the springs when the pressures to be employed in the tires are moderate and if the metal from which the plates 32 and 74 are formed is carefully selected with respect to its thickness and resiliency.

While I have shown and described certain forms which my invention may assume in practice, it is to be understood that various changes may be made in the proportions and arrangement of the parts without departing from the spirit and intent of my invention as set forth in the appended claims, which are to be broadly construed in the light of my disclosure.

What I claim is:

1. In a pressure control mechanism, an air pressure chamber, a valve casing secured to the wall of said chamber and provided with a passage extending through said casing and communicating with said chamber, a spring pressed valve positioned within said passage adjacent to each end thereof, said valves opening towards each other and inwardly of the passage through said casing, and means for holding one of said valves in its open position when the pressure in said chamber falls below a predetermined point.

2. In a pressure control mechanism, a valve casing provided with a passage extending therethrough, separate spring pressed valve members carried by said valve casing and located within opposite ends of said passage, said valves opening towards each other and inwardly of the passage through said casing, a stem carried by one of said valves and projecting beyond the end of said valve casing, and means for applying pressure to said valve stem for opening the valve under predetermined pressure conditions.

3. In a pressure control means, an air pressure chamber, a valve casing having a portion secured to one wall of the air pressure chamber and provided with a passage extending through said casing and communicating with the interior of said chamber, valves located within opposite ends of the passage in said valve casing, said valves opening towards each other and in opposite directions relative to the path of travel of air as it passes from said air pressure chamber and means in communication with said air pressure chamber having a portion movable upon a predetermined pressure variation within said chamber to open one of said valves.

4. A pressure control mechanism for a pneumatic inner tube comprising a valve casing having one end secured in the wall of the inner tube and provided with a single continuous passage communicating with the interior of the inner tube, valves spaced from each other longitudinally of said passage and movable independently of each other to close the passage and prevent the escape of air from said inner tube and the admission of air to said inner tube respectively, and a pressure control means carried by the valve casing and located within the inner tube for opening said air admission valve when the air pressure within the inner tube falls below a predetermined point.

In testimony whereof I have affixed my signature.

GODFREY A. DE LANGIE.